United States Patent [19]
Yu et al.

[11] Patent Number: 6,070,194
[45] Date of Patent: *May 30, 2000

[54] USING AN INDEX AND COUNT MECHANISM TO COORDINATE ACCESS TO A SHARED RESOURCE BY INTERACTIVE DEVICES

[75] Inventors: Ching Yu, Santa Clara; John M. Chiang, San Jose; Din-I Tsai, Fremont, all of Calif.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,148

[22] Filed: Dec. 17, 1997

[51] Int. Cl.$^7$ .................................................. G06F 15/16
[52] U.S. Cl. ......................... 709/229; 709/213; 710/28; 710/34; 710/36
[58] Field of Search .................... 709/229, 213; 710/52, 39, 36, 34, 28, 22, 3, 56

[56] References Cited

U.S. PATENT DOCUMENTS

| | | | |
|---|---|---|---|
| 4,538,224 | 8/1985 | Peterson | 710/22 |
| 4,783,730 | 11/1988 | Fischer | 710/5 |
| 5,386,524 | 1/1995 | Lary et al. | 395/400 |
| 5,721,955 | 2/1998 | Cedros et al. | 395/853 |
| 5,781,749 | 7/1998 | Le Quere | 395/309 |
| 5,809,334 | 9/1998 | Galdun et al. | 395/842 |
| 5,828,901 | 10/1998 | O'Toole et al. | 395/842 |
| 5,870,627 | 2/1999 | O'Toole et al. | 395/842 |
| 5,905,905 | 5/1999 | Dailey et al. | 395/825 |

*Primary Examiner*—Mehmet B. Geckil
*Attorney, Agent, or Firm*—Monica H. Choi

[57] ABSTRACT

Th present invention coordinates access to a shared resource, comprised of a plurality of segments, between a first device and a second device using an index and count mechanism. The present invention includes a respective descriptor, for each of the plurality of segments. Entries to the respective descriptors of the segments are maintained by the first device to inform the second device of activity between the first device and the shared resource. The present invention also includes a descriptor queue register, coupled to the first device and the second device. The first device writes an index into the descriptor queue register for indicating a starting descriptor of a corresponding segment that is available to the second device for access. The first device also writes a count into the descriptor queue register for indicating a subsequent number of descriptors, from the starting descriptor, of any corresponding segments that are available to the second device for access. By thus using this index and count mechanism, the second device does not poll the descriptors to determine any available segments within the shared resource thereby substantially eliminating bandwidth, delay, and data processing overhead associated with the polling process of the prior art. The present invention can be used to particular advantage when the first device is a CPU of a computer host system having a shared memory which is the shared resource and when the second device is a computer network peripheral device that couples the computer host system to a network of computers.

16 Claims, 3 Drawing Sheets

USING AN INDEX AND COUNT MECHANISM TO COORDINATE ACCESS TO A SHARED RESOURCE BY INTERACTIVE DEVICES

TECHNICAL FIELD

This invention relates to interaction between electronic devices, and more particularly, to a mechanism for coordinating access to a shared resource by multiple interactive electronic devices using an index and count entry into a descriptor queue register.

BACKGROUND OF THE INVENTION

The present invention will be described with an example application for an Ethernet computer network peripheral device which couples a host computer system to a network of computers. In this example application, a CPU of the host computer system and the Ethernet computer network peripheral device share access to a shared memory within the host computer system. However, from this example application, it should be appreciated by one of ordinary skill in the art of electronic systems design how the present invention may be used for other applications requiring coordination of access to a shared resource by more than one electronic device.

Referring to FIG. 1, a network of computers 100 includes a first computer 102, a second computer 104, a third computer 106, and a fourth computer 108 interconnected to each other via a linking network 110. A computer peripheral device 112 is within the first computer 102 to provide added functionality to the first computer 102. For example, this computer peripheral device 112 may be an Ethernet computer network peripheral device which allows the first computer 102 to communicate with the other computers 104, 106, and 108 via the linking network 110 which may be part of the Internet.

Referring to FIG. 2, such a computer peripheral device 112 within the first computer 102 receives and transmits data packets on a network of computers 202 which includes the linking network 110, the second computer 104, the third computer 106, and the fourth computer 108 in FIG. 1. The computer peripheral device 112 which may be an Ethernet computer network peripheral device receives and transmits data packets on the network of computers 202 in accordance with standard data communications protocols such as the IEEE 802.3 network standard or the DIX Ethernet standard as is commonly known to one of ordinary skill in the art of Ethernet computer network peripheral device design.

The first computer 102 may be a PC or a workstation, and the host system of the first computer 102 includes a CPU 204 and a shared memory 206 which may be any data storage device found in a PC or a workstation. The CPU 204 further processes a data packet received from the network of computers 202 or generates a data packet to be transmitted on the network of computers 202. The shared memory 206 is shared between the CPU and the computer network peripheral device 112. In a DMA (Direct Memory Access) mode of operation, the computer network peripheral device 112 has direct access to the shared memory 206 within the host system of the first computer 102.

When the computer network peripheral device receives a data packet from the network of computers 202, that data packet is written into the shared memory 206 directly by the computer network peripheral device 112 for further processing by the host system CPU 204. The CPU 204 also accesses the shared memory 206 to further process the data packet stored within the shared memory 206.

Alternatively, the CPU 204 accesses the shared memory 206 to write a data packet to be transmitted on the network of computers 202. The computer network peripheral device 112 then accesses the shared memory 206 to read the stored data packet in order to transmit such a data packet over the network of computers 202.

Since both the CPU 204 and the computer network peripheral device 112 access the shared memory 206, a mechanism that coordinates access to the shared memory 206 between a first device (i. e. the CPU 204) and a second device (i.e. the computer network peripheral device 112) assures harmonious interaction between the two devices. For example, if the CPU 204 writes a data packet into the shared memory, the computer network peripheral device 112 for harmonious interaction reads that data packet after the CPU has sufficiently written that data packet into the shared memory 206 (i.e. when that data packet within the shared memory 206 is ready for processing by the computer network peripheral device 112). Alternatively, if the computer network peripheral device 112 receives a data packet from the network of computers 202, the computer network peripheral device 112 for harmonious interaction writes that data packet to an available space in the shared memory 206 that does not already have prior data that needs further processing.

SUMMARY OF THE INVENTION

Accordingly, a primary object of the present invention is to coordinate access to a shared resource such as shared memory, comprised of a plurality of segments such as a plurality of buffers for the example of the shared memory, between a first device and a second device, using an efficient coordination mechanism.

In a general aspect of the present invention, an apparatus and method which thus coordinates access to the shared resource includes a respective descriptor that has access information, for a corresponding segment of the plurality of segments, written into the respective descriptor by the first device. In addition, the present invention includes a descriptor queue register, coupled to the first device and the second device. The first device writes into the descriptor queue register information for indicating any descriptors corresponding to any segments which are available to the second device for access.

More specifically, the first device writes an index into the descriptor queue register for indicating a starting descriptor of a corresponding segment that is available to the second device for access. The first device also writes a count into the descriptor queue register for indicating a subsequent number of descriptors, from the starting descriptor, of any corresponding segments that are available to the second device for access.

The present invention may further include a respective status, for each of the plurality of segments, that has result of access information, for a corresponding segment, written into the respective status by the second device when the second device has accessed the corresponding segment.

The present invention can be used to particular advantage when the shared resource is a shared memory within a host computer system having a CPU that is the first device and when the second device is a computer network peripheral device that couples the host computer system to a network of computers. In that case, the plurality of segments are a plurality of buffers, within the shared memory, that store data packets, and the respective descriptor and the respective status may be part of the shared memory of the host computer system. Also in that case, the data queue register may be within a data storage device of the computer network peripheral device. Furthermore in that case, the computer network peripheral device accesses any available buffer for writing a data packet received from the network of computers, and the index and count of the descriptor queue register indicate any available buffer for receiving the data packet. Alternatively, the computer network peripheral device accesses any available buffer for reading a data packet to be transmitted to the network of computers, and the index and count of the descriptor queue register indicate any available buffer having the data packet to be transmitted to the network of computers.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Moreover, elements having the same reference number in FIGS. 1–5 refer to elements having similar structure and function.

DETAILED DESCRIPTION

Figure 1:
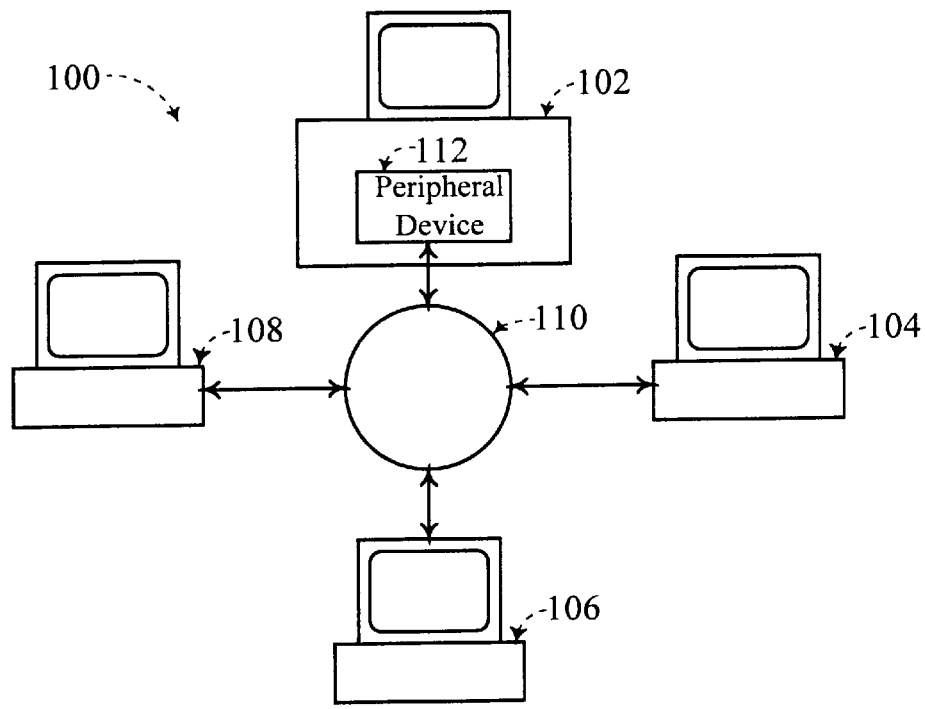
FIG. 1 shows a computer network peripheral device within a computer that is coupled to a network of computers.
Figure 2:
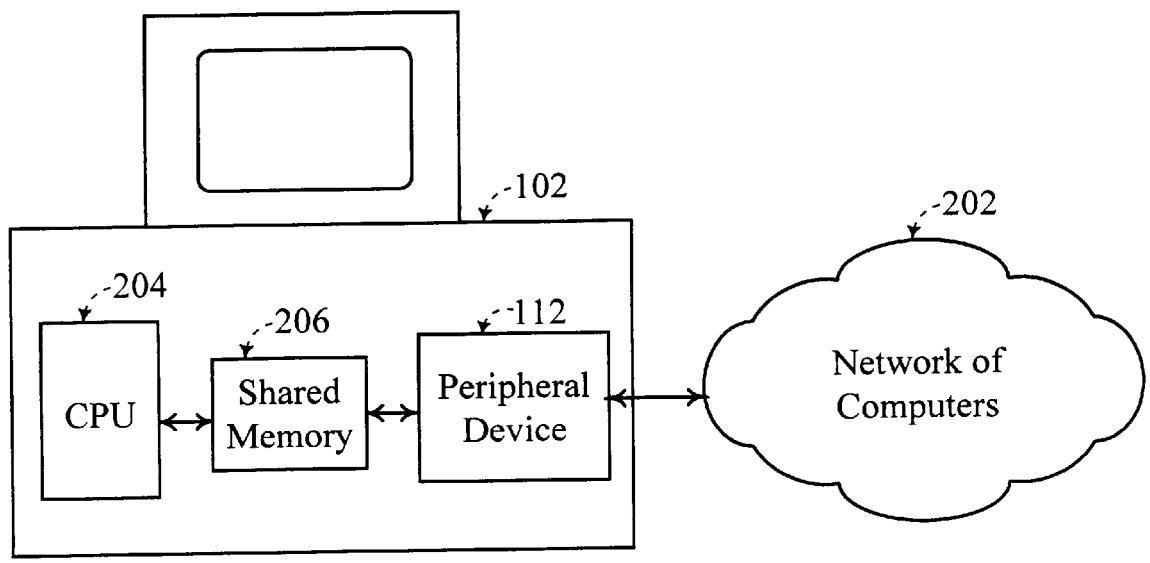
FIG. 2 shows a shared memory that is accessed by two interactive devices including a CPU and a computer network peripheral device.
Figure 3:
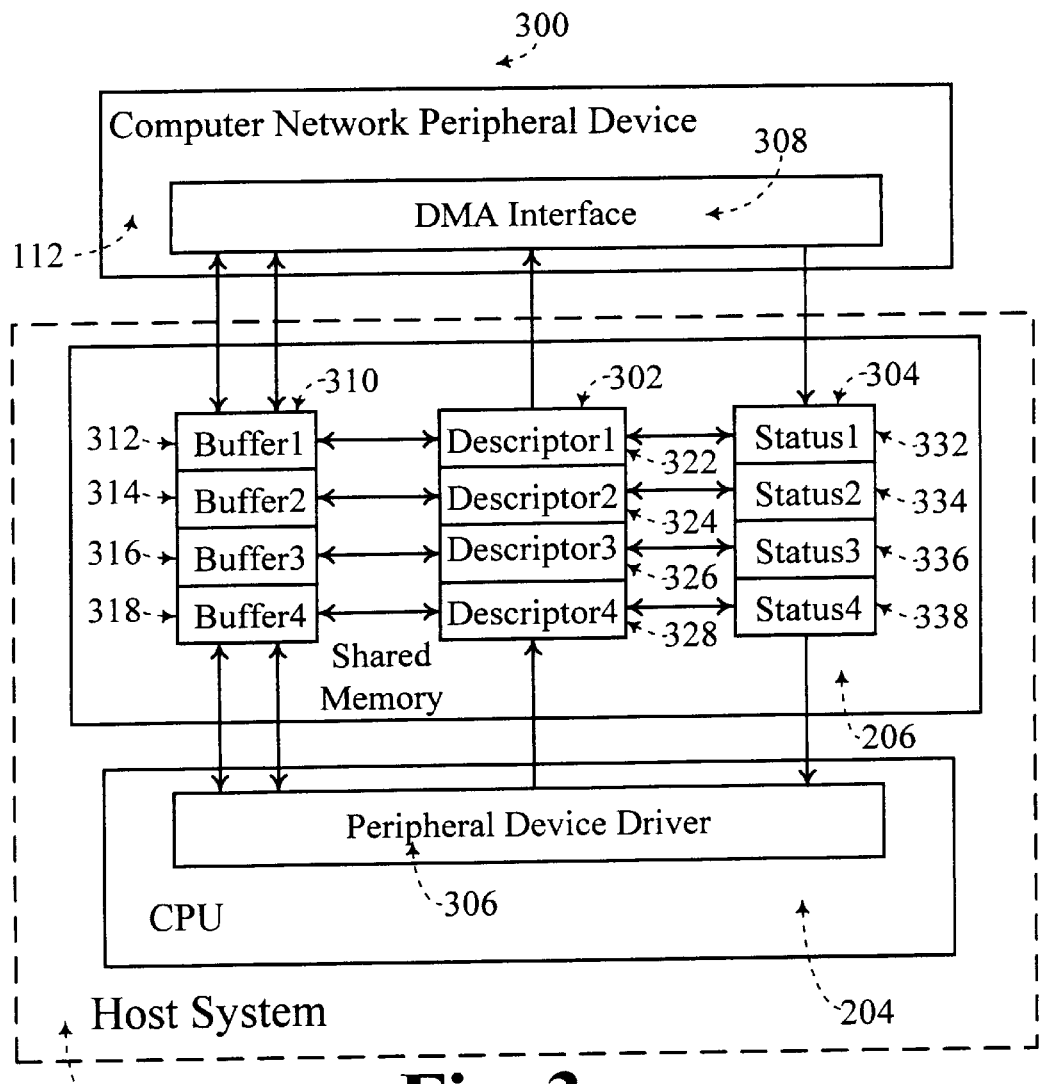
FIG. 3 shows an apparatus that coordinates access to the shared memory by the CPU and the computer network peripheral device, according to the prior art.

Referring to FIGS. 2 and 3, a prior art apparatus 300 includes descriptors 302 and status 304 for coordinating access to the shared memory 206. The CPU 204 and the shared memory 206 are within the host system of the first computer 102. The CPU 204 includes a peripheral device driver 306 (which typically may be a software module running within the CPU 204) for accessing the shared memory 206 and for otherwise interacting with the computer network peripheral device 112. The computer network peripheral device 112 includes a DMA (Direct Memory Access) interface 308 for accessing the shared memory 206.

The shared memory 206 includes a plurality of buffers 310 including a first buffer 312, a second buffer 314, a third buffer 316, and a fourth buffer 318. (Note that the shared memory 206 typically has a considerably larger number of buffers, but only four buffers are shown in FIG. 3 for clarity of illustration.) The plurality of buffers 310 store data packets received or to be transmitted on the network of computers 202 of FIG. 2. Each of the buffers 312, 314, 316, and 318 is a respective space in the shared memory 206. Each such buffer may be located within any space within the shared memory 206, and the buffers 312, 314, 316, and 318 are not necessarily contiguous in location within the shared memory 206.

For each buffer, a respective descriptor and a respective status is implemented within the shared memory 206. (However, the present invention may also be practiced with the respective descriptor and the respective status located within any data storage device outside of the shared memory 206.) Thus, a first descriptor 322 and a first status 332 correspond to the first buffer 312. A second descriptor 324 and a second status 334 correspond to the second buffer 314. A third descriptor 326 and a third status 336 correspond to the third buffer 316. A fourth descriptor 328 and a fourth status 338 correspond to the fourth buffer 318.

A respective descriptor contains access information for a corresponding buffer. The access information is written into the descriptor by the peripheral device driver 306 within the CPU 204. The access information includes information as to whether that corresponding buffer is available to the computer network peripheral device 112. The corresponding buffer may not be available because the CPU has not yet sufficiently accessed or processed the data within that corresponding buffer. On the other hand, that corresponding buffer may be available to the computer network peripheral device for a read of a data packet to be transmitted or for a write of a data packet received on the network of computers 202. The access information within a respective descriptor may further include buffer location and content information for the corresponding buffer.

Thus, the entries within descriptors are maintained by the CPU 204 to inform the computer network peripheral device 112 of the state of activity between the CPU 204 and each of the plurality of buffers 310. When the CPU 204 wishes to send a data packet on the network of computers 202 of FIG. 2, the peripheral device driver 306 writes that data packet into a buffer. The peripheral device driver 306 then updates a respective descriptor corresponding to that buffer indicating that the computer network peripheral device may now read that buffer for that data packet to be transmitted on the network of computers 202.

Alternatively, when the CPU 204 wishes to further process any data packet received from the network of computers 202, the peripheral device driver 306 updates a respective descriptor corresponding to an available buffer indicating that the computer network peripheral device 112 may now write that data packet into that available buffer. The CPU 204 determines that the available buffer may receive that data packet when the CPU 204 has sufficiently accessed or processed any data that was formerly within that available buffer.

Once the computer network peripheral device 112 has accessed an available buffer, the DMA interface 308 writes result of access information into a respective status for that available buffer. The result of access information may include information that the computer network peripheral device 112 has successfully accessed that available buffer. The result of access information may also include information regarding the result of processing a data packet that was read by the DMA interface 308 from that available buffer, such as success or failure of transmitting a data packet over the network of computers 202.

In any case, the entries within the status 304 are maintained by the computer network peripheral device 112 to inform the CPU 204 of the state of activity between the computer network peripheral device 112 and each of the plurality of buffers 310. The result of access information in turn informs the CPU 204 that a buffer is available to the CPU 204 after the computer network peripheral device 112 has sufficiently accessed or processed the data within that available buffer. The CPU 204 may then write into an available buffer another data packet to be transferred on the network of computers 202, or may then read an available buffer for a data packet that has been received from the network of computers 202.

In the prior art apparatus 300, the DMA interface 308 polls each of the descriptors 302 to determine which of the plurality of buffers 310 are available to the computer network peripheral device 308 for access. When the computer network peripheral device 112 receives a data packet from the network of computers 202, the DMA interface 308 polls the descriptors 302 to determine an available buffer that is accessible for writing that data packet into that available buffer. Alternatively, the DMA interface 308 also polls the descriptors 302 to determine if an available buffer is accessible for reading a data packet, within that available buffer, to be transmitted on the network of computers 202. However, such constant polling consumes a relatively large amount of bandwidth in the bus interface between the shared memory 206 of the host system 102 and the computer network peripheral device 112. Moreover, such polling introduces added delay and data processing overhead for each polling of a descriptor.

Figure 4:
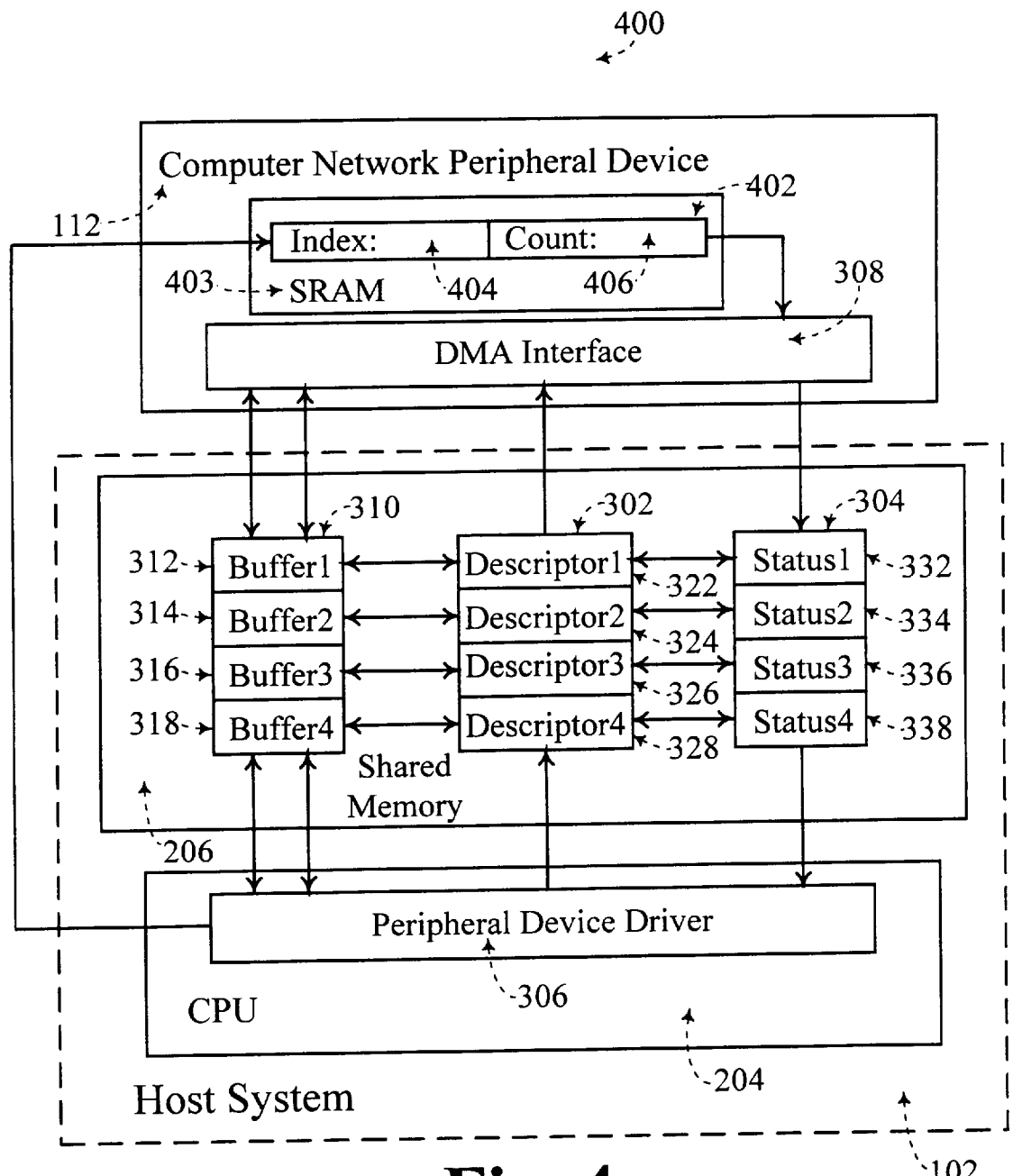
FIG. 4 shows an apparatus of the present invention that coordinates access to the shared memory by the CPU and the computer network peripheral device using an index and count mechanism, according to a preferred embodiment of the present invention.

Referring to FIG. 4, an apparatus of the present invention 400 includes an index and count mechanism to substantially eliminate such a cumbersome polling process of the prior art. (Note that elements having the same reference number in FIGS. 3 and 4 refer to elements having similar structure and function.) The apparatus of the present invention 400 further includes a descriptor queue register 402 within a SRAM 403 (Static Random Access Memory) of the computer network peripheral device 112. (Alternatively, the descriptor queue register 402 may be within any other type of a data storage device of the computer network peripheral device 112.)

The peripheral device driver 306 updates entries within the descriptor queue register 402. The descriptor queue register 402 comprises an index 404 and a count 406. The peripheral device driver 306 writes an entry in the index 404 for indicating a starting descriptor of a corresponding buffer that is available to the computer network peripheral device 112 for access. Additionally, the peripheral device driver 306 writes an entry in the count 406 for indicating a subsequent number of descriptors, from the starting descriptor, of any corresponding buffers that are available to the computer network peripheral device 112 for access.

Figure 5:
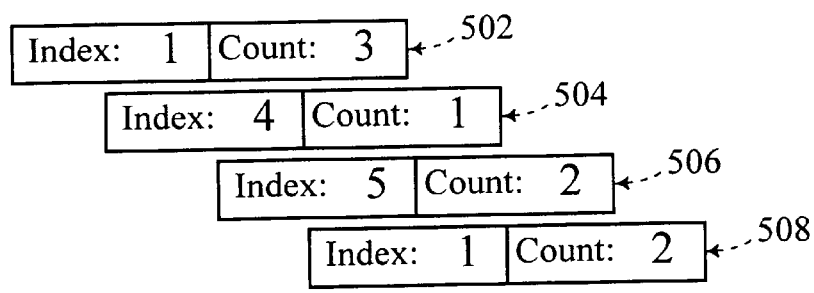
FIG. 5 shows example entries of index and count within the apparatus of the present invention of FIG. 4, according to a preferred embodiment of the present invention.

For example, referring to FIG. 5, a first descriptor queue register entry 502 has an index of 1 and a count of 3. This entry indicates to the computer network peripheral device 112 that the first descriptor is available and that there are a total of 3 total descriptors in a batch of descriptors that are available for access. Thus, the subsequent two descriptors after the first descriptor are also available to the computer network peripheral device 112 for access. A second descriptor queue register entry 504 then has an index of 4 and a count of 1. This entry indicates to the computer network peripheral device 112 that the fourth descriptor and no subsequent descriptor from the fourth descriptor is available for access. A third descriptor queue register entry 506 then has an index of 5 and a count of 2. This entry indicates to the computer network peripheral device 112 that the fifth descriptor and the subsequent one descriptor from the fourth descriptor is also available for access.

A fourth descriptor queue register entry 508 then has an index back to 1 and a count of 2. This entry indicates to the computer network peripheral device 112 that the first descriptor and the subsequent one descriptor from the first descriptor is also available for access. Thus, the fourth descriptor indicates that buffer access has recycled back to the first descriptor. For each index and count entry within the descriptor queue register 402, the computer network peripheral device 112 accesses any available buffers as indicated by the index and count entries. Upon access, the DMA interface 308 either reads a data packet from any buffer having such a data packet for transmission on the network of computers 202 or writes a data packet received from the network of computers 202 into any buffer available for receiving such a data packet.

In this manner, the DMA interface 308 does not poll the descriptors 302 to determine which of the buffers 310 are available. Rather, the DMA interface 308 simply reads the index and count entry within the descriptor queue register 402 to determine available buffers for access. With such an index and count mechanism of the present invention, the DMA interface may access multiple available buffers in a batch with one index and count entry as illustrated with reference to FIG. 5. Thus, the bandwidth requirement, delay, and processing overhead associated with the process of polling descriptors (as used in the prior art) has been substantially eliminated.

The foregoing is by way of example only and is not intended to be limiting. For example, the present invention may be practiced with any number of buffers within the shared memory. In addition, the descriptor queue register 402 may alternatively be located in any data storage device aside from just the SRAM 403 of the computer network peripheral device 112. More importantly, the index and count entry mechanism of the present invention may be used for coordinating access to any type of shared resource (aside from just the example of the shared memory 206) having a plurality of segments (aside from just the example of the plurality of memory buffers) by any type of interactive electronic devices (aside from just the example of the CPU 204 and the computer network peripheral device 112). The invention is limited only as defined in the following claims and equivalents thereof.

We claim:

1. Apparatus for coordinating access to a shared resource, comprised of a list of plurality of segments, between a first device and a second device, the list of plurality of segments being cyclically processed by said second device in a predetermined sequential order of said list of segments, the apparatus comprising:

a plurality of descriptors, each of the plurality of descriptors corresponding to a respective and unique segment of said plurality of segments for having respective access information for said respective and unique segment, said respective access information being written into a descriptor by said first device;

and wherein said plurality of descriptors are processed in said predetermined sequential order by said second device when said second device processes said list of plurality of segments in said predetermined sequential order; and a descriptor queue register, coupled to the first device and the second device, the first device writing an index into the descriptor queue register for indicating a starting descriptor of a starting segment of the list of plurality of segments that is available to the second device for access, and wherein the first device writes a count into the descriptor queue register for indicating a subsequent number of descriptors, from the starting descriptor, of any subsequent segments from the starting segment of the list of plurality of segments that are available to the second device for access during processing of said list of plurality of segments in said predetermined sequential order by said second device;

wherein said starting segment and said subsequent segments that are available for access form an available batch of segments that is a portion of said list of plurality of segments;

and wherein said first device adjusts said index and said count a plurality of times as said available batch of segments that is a portion of said list of plurality of segments changes a plurality of times during a cycle of processing said list of plurality of segments in said predetermined sequential order.

2. The apparatus of claim 1, further comprising:

a respective status, for each of the plurality of segments, that has result of access information, for a corresponding segment, written into the respective status by the second device when the second device has accessed the corresponding segment.

3. The apparatus of claim 1, wherein the shared resource is a shared memory within a host computer system having a CPU that is the first device and wherein the second device is a computer network peripheral device that couples the host computer system to a network of computers, and wherein the plurality of segments is a plurality of buffers within the shared memory that store data packets.

4. The apparatus of claim 3, wherein the respective descriptor and the respective status are part of the shared memory of the host computer system.

5. The apparatus of claim 3, wherein the data queue register is within a data storage device of the computer network peripheral device.

6. The apparatus of claim 3, wherein the computer network peripheral device accesses any available buffer for writing a data packet received from the network of computers, and wherein the index and the count of the descriptor queue register indicate any available buffer for receiving the data packet.

7. The apparatus of claim 3, wherein the computer network peripheral device accesses any available buffer for reading a data packet to be transmitted to the network of computers, and wherein the index and the count of the descriptor queue register indicate any available buffer having the data packet to be transmitted to the network of computers.

8. An apparatus for coordinating access to a shared memory, comprised of a list of a plurality of buffers for storing data packets, between a CPU of a host computer system having the shared memory and a computer network peripheral device that couples the host computer system to a network of computers, the list of plurality of buffers being cyclically processed by said computer network peripheral device in a predetermined sequential order of said list of buffers, the apparatus comprising:

a plurality of descriptors, each of the plurality of descriptors corresponding to a respective and unique buffer of said plurality of buffers for having respective access information for said respective and unique buffer, said respective access information being written into a descriptor by said CPU of the host computer system, wherein the respective access information includes any of location, content, and availability information for the corresponding buffer;

a descriptor queue register within a SRAM (Static Random Access Memory) of the computer network peripheral device, coupled to the CPU of the host computer system, the CPU writing an index into the descriptor queue register for indicating a starting descriptor of a starting buffer that is available to the computer network peripheral device for access, and the computer host system writing a count into the descriptor queue register for indicating a subsequent number of descriptors, from the starting descriptor, of any subsequent buffers from said starting buffer that are available to the computer network peripheral device for access during processing of said list of plurality of buffers in said predetermined sequential order by said computer network peripheral device, wherein said starting buffer and said subsequent buffers that are available for access form an available batch of buffers that is a portion of said list of plurality of buffers;

and wherein said first device adjusts said index and said count a plurality of times as said available batch of buffers that is a portion of said list of plurality of buffers changes a plurality of times during a cycle of processing said list of plurality of buffers in said predetermined sequential order;

wherein the computer network peripheral device accesses any available buffer for writing a data packet received from the network of computers, and wherein the index and the count of the descriptor queue register indicate any available buffer for receiving the data packet, and wherein the computer network peripheral device accesses any available buffer for reading a data packet to be transmitted to the network of computers, and wherein the index and the count of the descriptor queue register indicate any available buffer having the data packet to be transmitted to the network of computers; and a respective status within the shared memory, for each of the plurality of buffers, that has result of access information, for a corresponding buffer, written into the respective status by the computer network peripheral device when the computer network peripheral device has accessed the corresponding buffer, wherein the result of access information includes information resulting from the computer network peripheral device processing data within the corresponding buffer.

9. An apparatus for coordinating access to a shared resource, comprised of a list of plurality of segments, between a first device and a second device, the list of plurality of segments being cyclically processed by said second device in a predetermined sequential order of said list of segments, the apparatus comprising:

a plurality of descriptors, each of the plurality of descriptors corresponding to a respective and unique segment of said plurality of segments for having respective access information for said respective and unique segment, said respective access information being written into a descriptor by said first device;

and wherein said plurality of descriptors are processed in said predetermined sequential order by said second device when said second device processes said list of plurality of segments in said predetermined sequential order;

means for indicating a starting descriptor of a starting segment of the list of plurality of segments that is available to the second device for access, and for indicating a subsequent number of descriptors, from the starting descriptor, of any subsequent segments from the starting segment of the list of plurality of segments that are available to the second device for access during processing of said list of plurality of segments in said predetermined sequential order by said second device;

wherein said starting segment and said subsequent segments that are available for access form an available batch of segments that is a portion of said list of plurality of segments; and means for adjusting said starting descriptor and said subsequent number of descriptors that are available for access a plurality of times as said available batch of segments that is a portion of said list of plurality of segments changes a plurality of times during a cycle of processing said list of plurality of segments in said predetermined sequential order.

10. The apparatus of claim 9, further comprising:

a respective status, for each of the plurality of segments, that has result of access information, for a corresponding segment, written into the respective status by the second device when the second device has accessed the corresponding segment.

11. The apparatus of claim 10, wherein the resource is a shared memory within a host computer system having a CPU that is the first device and wherein the second device is a computer network peripheral device that couples the host computer system to a network of computers, and wherein the plurality of segments is a plurality of buffers that store data packets, and wherein the computer network peripheral device accesses any available buffer for writing a data packet received from the network of computers, and wherein the index and the count of the descriptor queue register indicate any available buffer for receiving the data packet, and wherein the computer network peripheral device accesses any available buffer for reading a data packet to be transmitted to the network of computers, and wherein the index and the count of the descriptor queue register indicate any available buffer having the data packet to be transmitted to the network of computers.

12. A method for coordinating access to a shared resource, comprised of a list of a plurality of segments, between a first device and a second device, the list of plurality of segments being cyclically processed by said second device in a predetermined sequential order of said list of segments, the method including the steps of:

writing respective access information into a respective descriptor, for each of the plurality of segments, each of a plurality of descriptors corresponding to a respective and unique segment of said plurality of segments for having said respective access information for said respective and unique segment, said respective access information being written into a descriptor by said first device;

and wherein said plurality of descriptors are processed in said predetermined sequential order by said second device when said second device processes said plurality of segments in said predetermined sequential order;

writing an index into a descriptor queue register for indicating a starting descriptor of a starting segment of the plurality of segments that is available to the second device for access, and writing a count into the descriptor queue register for indicating a subsequent number of descriptors, from the starting descriptor, of any subsequent segments from the starting segment of the plurality of segments that are available to the second device for access during processing of said plurality of segments in said predetermined sequential order by said second device;

wherein said starting segment and said subsequent segments that are available for access form an available batch of segments that is a portion of said list of plurality of segments; and adjusting said index and said count a plurality of times as said available batch of segments that is a portion of said list of plurality of segments changes a plurality of times during a cycle of processing said list of plurality of segments in said predetermined sequential order.

13. The method of claim 12, further including the step of:

writing a respective result of access information into a respective status, for each of the plurality of segments, from the second device when the second device has accessed a corresponding segment.

14. The method of claim 12, wherein the shared resource is a shared memory within a host computer system having a CPU that is the first device and wherein the second device is a computer network peripheral device that couples the host computer system to a network of computers, and wherein the plurality of segments is a plurality of buffers that store data packets.

15. The method of claim 14, wherein the computer network peripheral device accesses any available buffer for writing a data packet received from the network of computers, and wherein the index and the count of the descriptor queue register indicate any available buffer for receiving the data packet.

16. The method of claim 14, wherein the computer network peripheral device accesses any available buffer for reading a data packet to be transmitted to the network of computers, and wherein the index and the count of the descriptor queue register indicate any available buffer having the data packet to be transmitted to the network of computers.

* * * * *